(12) United States Patent
Hirota

(10) Patent No.: US 8,521,903 B2
(45) Date of Patent: Aug. 27, 2013

(54) METHOD OF SETTING BIDIRECTIONAL PATH, AND COMMUNICATION SYSTEM AND NODE DEVICE FOR PROVIDING THE SAME

(75) Inventor: Masaki Hirota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 12/068,126

(22) Filed: Feb. 1, 2008

(65) Prior Publication Data

US 2008/0186951 A1    Aug. 7, 2008

(30) Foreign Application Priority Data

Feb. 5, 2007  (JP) .................................. 2007-025581

(51) Int. Cl.
*G06F 15/16* (2006.01)

(52) U.S. Cl.
USPC ............................ 709/238; 709/237; 709/227

(58) Field of Classification Search
USPC ......................................... 709/238, 237, 227
See application file for complete search history.

(56) References Cited

U.S. PATENT DOCUMENTS

| | | | | |
|---|---|---|---|---|
| 2003/0137937 A1* | 7/2003 | Tsukishima et al. | .......... | 370/230 |
| 2004/0073717 A1* | 4/2004 | Cline et al. | .................... | 709/250 |
| 2007/0058568 A1* | 3/2007 | Previdi et al. | ................ | 370/254 |
| 2007/0070909 A1* | 3/2007 | Reeve | ............................ | 370/238 |
| 2008/0267125 A1* | 10/2008 | Shaheen et al. | ............... | 370/329 |

FOREIGN PATENT DOCUMENTS

| | | | |
|---|---|---|---|
| GB | 2425688 | * | 4/2005 |
| JP | 2002-152263 | | 5/2002 |
| JP | 2004-23382 | | 1/2004 |
| JP | 2005-354745 | | 12/2005 |

OTHER PUBLICATIONS

D. Awduche et al., "RSVP-TE: Extensions to RSVP for LSP Tunnels", RFC3209, pp. 1-61, Dec. 2001.
L. Berger, "Generalized Multi-Protocol Label Switching (GMPLS) Signaling Resource ReserVation Protocol-Traffic Engineering (RSVP-TE) Extensions", RFC3473, pp. 1-42, Jan. 2003.
N. Matsuura et al., "MPLS Signaling in Photonic IP Networks, Section 3", Technical Report of IEICE, IN2002-37, Jul. 11, 2002, pp. 25-28.
Japanese Office Action issued Mar. 8, 2011 in corresponding Japanese Patent Application 2007-025581.
Japanese Official Communication mailed Oct. 30, 2012 in Japanese Patent Application No. 2007-025581.

* cited by examiner

*Primary Examiner* — Lan-Dai T Truong
(74) *Attorney, Agent, or Firm* — Staas & Halsey LLP

(57) ABSTRACT

Disclosed is a method of setting a bidirectional path between a first node and a second node in a network. A first path from the first node to the second node is established by a first path establishing procedure in which a first path message including a record of a route through which the first path message is forwarded from the first node to the second node. A second path from the second node to the first node along the route of the first path in the backward direction is established by a second path establishing procedure in which a second path message including a route specification determined based on the record of the route included in the first path message is transferred from the second node to the first node.

12 Claims, 8 Drawing Sheets

METHOD OF SETTING BIDIRECTIONAL PATH, AND COMMUNICATION SYSTEM AND NODE DEVICE FOR PROVIDING THE SAME

CROSS-REFERENCE TO RELATED APPLICATION(S)

This application is related to and claims priority to Japanese Patent Application No. 2007-025581, and incorporated herein by reference.

BACKGROUND OF THE INVENTION

1. Field of the Invention

The present invention relates to a method of setting bidirectional path, and a communication system and a node device for providing the setting method, and in particular, to a method for setting a bidirectional path between nodes in a network which supports MPLS (Multi Protocol Label Switching) protocol, and a communication system and a node device for providing the setting method.

2. Description of the Related Art

There is RSVP-TE (Resource reSerVation Protocol-Traffic Engineering) defined by IETF RFC3209 (which can be downloaded from URL [http://www.ietf.org/rfc/rfc3209.txt]) as a protocol for dynamically performing label distribution between devices in order to set up (establish) a path (LSP: Label Switch Path) in MPLS. In the RSVP-TE, a path message (Path) corresponding to a requirement of LSP setup is sent from an Ingress node to an Egress node and a label for transfer is returned in the backward direction by using a reserve message (Resv) to setup a LPS as shown in FIG. 1. As shown in FIG. 1, when communication is performed between two bases (nodes) #1, #3 in bidirectional directions, LSP's 14, 16 are respectively independently set up by signaling 10, 12 in each direction of Node#1 (Ingress) to Node#3 (Egress) and Node#3 (Ingress) to Node#1 (Egress). In FIG. 1, signaling 10 for setting a path in the direction of Node#1 (Ingress) to Node#3 (Egress) is denoted by a sign #13, and signaling 12 for setting a path in the direction of Node#3 (Ingress) to Node#1 (Egress) is denoted by a sign #31. Herein, the timings of setup of the LSP's 14, 16 are respectively independent and the routes thereof are not necessarily the same as shown in FIG. 1. This is because each of the nodes #1, #2, and #3 independently selects a route in accordance with a usage status of the bandwidth when setting up a LSP.

Pseudo Wire is a technology for connecting two nodes by a pseudo wire by using the MPLS. The pseudo wire is a path established in bidirectional directions by which data of all sorts of protocols such as SONET/WDM, ATM, frame relay, or the like can be carried. In this case, as in the conventional SONET/WDM, it is desirable that the paths connecting two bases are the same route and the timings of setup are also the same for network administration. The reason is because, it is easier for an operator to understand and to figure out when data passes the same route than when data passes discrete routes, and only one operation is required when the timings of setup are the same.

However, RSVP-TE is generally used for a label distribution protocol for setting MPLS LSP for leading the Pseudo Wire. Accordingly, there is no assurance that a forward and a backward LSP's pass the same route between two bases. Further, setup timings of LSP's are independent. Accordingly, there is a problem in that administration becomes complicated.

It is possible to set a bidirectional LSP by the same route by explicitly specifying the route by using Explicit Route Object (ERO). However, a forward LSP and a backward LSP are independent, so that there is no association between timings of setup. For example, it is possible to set up a backward LSP after setting a forward LSP by hand. However, it is impossible to automatically set up a forward LSP and a backward LSP. Further, as for the route, administration by a person is required in order to set two LSP's to the same route.

There is RSVP-TE (IETF RFC3473) extended for G(General)MPLS as a technique for setting up LSP's by the same route at the same time. IETF RFC3473 can be downloaded from URL [http://www.ietf.org/rfc/rfc3473.txt]. This is one in which Upstream Label object and the like are newly added and extended with respect to the above RSVP-TE of RFC3209. In the GMPLS RSVP-TE, as shown in FIG. 2, it becomes possible to setup a bidirectional LSP by only reciprocating a Path/Resv message by adding an Upstream Label object (ULO) to a path message (#13-Path with ULO in FIG. 2) and distributing a label for a backward LSP with the path message. Note that a label for the forward LSP is distributed with a reserve message (#13-Resv+LO in FIG. 2) as before.

However, when the Object is received by a node in which MPLS RSVP-TE is supported and GMPLS RSVP-TE is not supported, the Object can not be understood to be destroyed. Accordingly, there is a problem in that all of the nodes in a domain have to be extended to the GMPLS RSVP-TE in order to provide a bidirectional LSP.

SUMMARY

According to one aspect of an embodiment, there is provided a method of setting a bidirectional path between a first node and a second node in a network. The method comprises: establishing a first path from the first node to the second node by a first path establishing procedure including transferring a first path message including a record of a route through which the first path message is forwarded from the first node to the second node, and establishing a second path from the second node to the first node along the route of the first path in the backward direction, by a second path establishing procedure including transferring, from the second node to the first node, a second path message including a route specification determined based on the record of the route included in the first path message received by the second node.

According to another aspect of the embodiment, the first path establishing procedure includes: transferring a first reserve message for carrying a label assigned to the first path, from the second node to the first node, in response to the reception of the first path message, and transferring a first reserve confirmation message for confirming the reaching of the first reserve message, from the first node to the second node, in response to the reception of the first reserve message, and the second path message in the second path establishing procedure is transmitted from the second node in response to the reception of the first reserve confirmation message.

DESCRIPTION OF THE PREFERRED EMBODIMENTS

Figure 1:
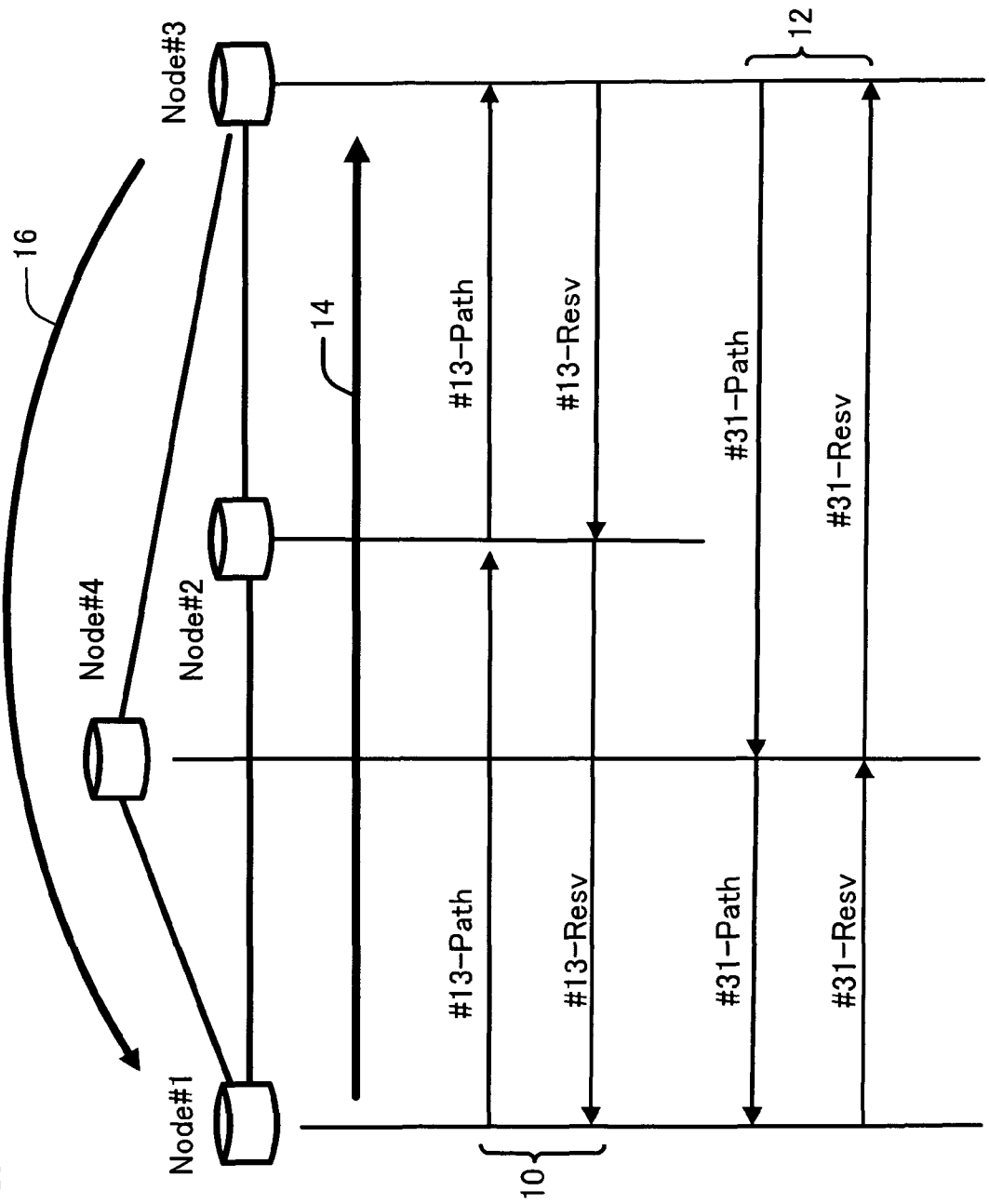
FIG. 1 is a sequence diagram illustrating an establishing procedure of a bidirectional path by conventional MPLS RSVP-TE.
Figure 2:
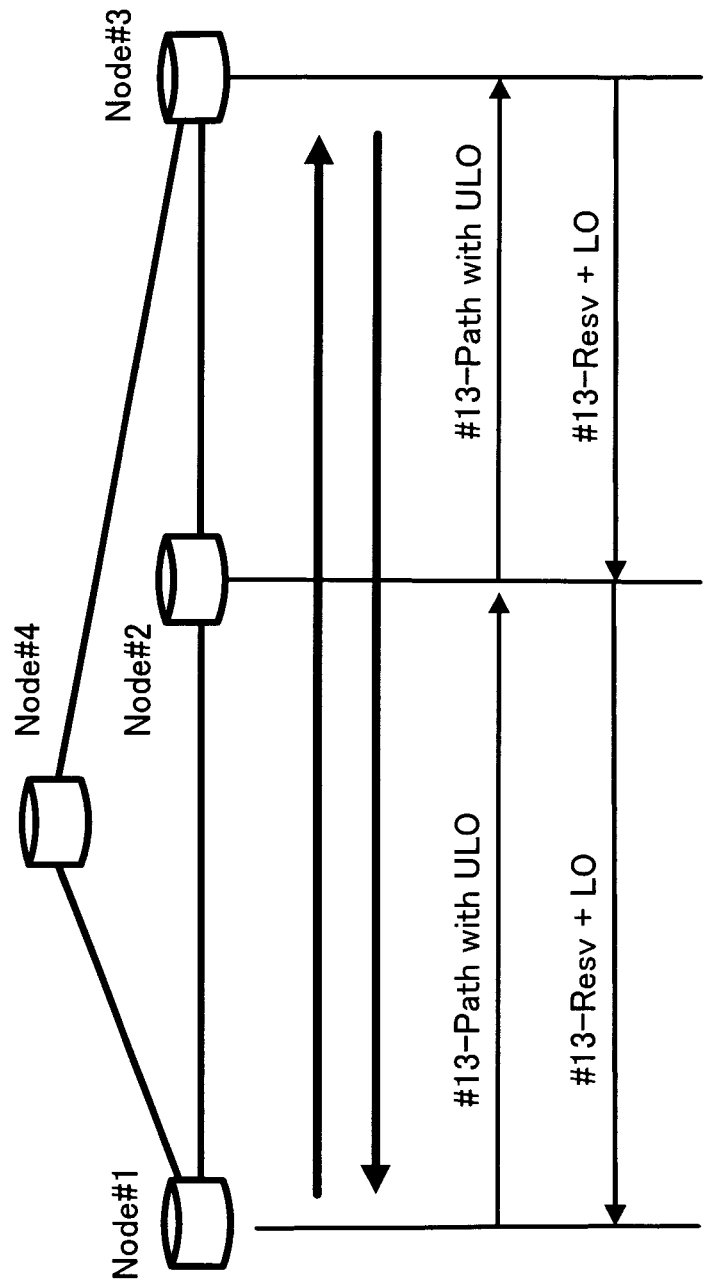
FIG. 2 is a sequence diagram illustrating an establishing procedure of a bidirectional path by conventional GMPLS RSVP-TE.
Figure 3:
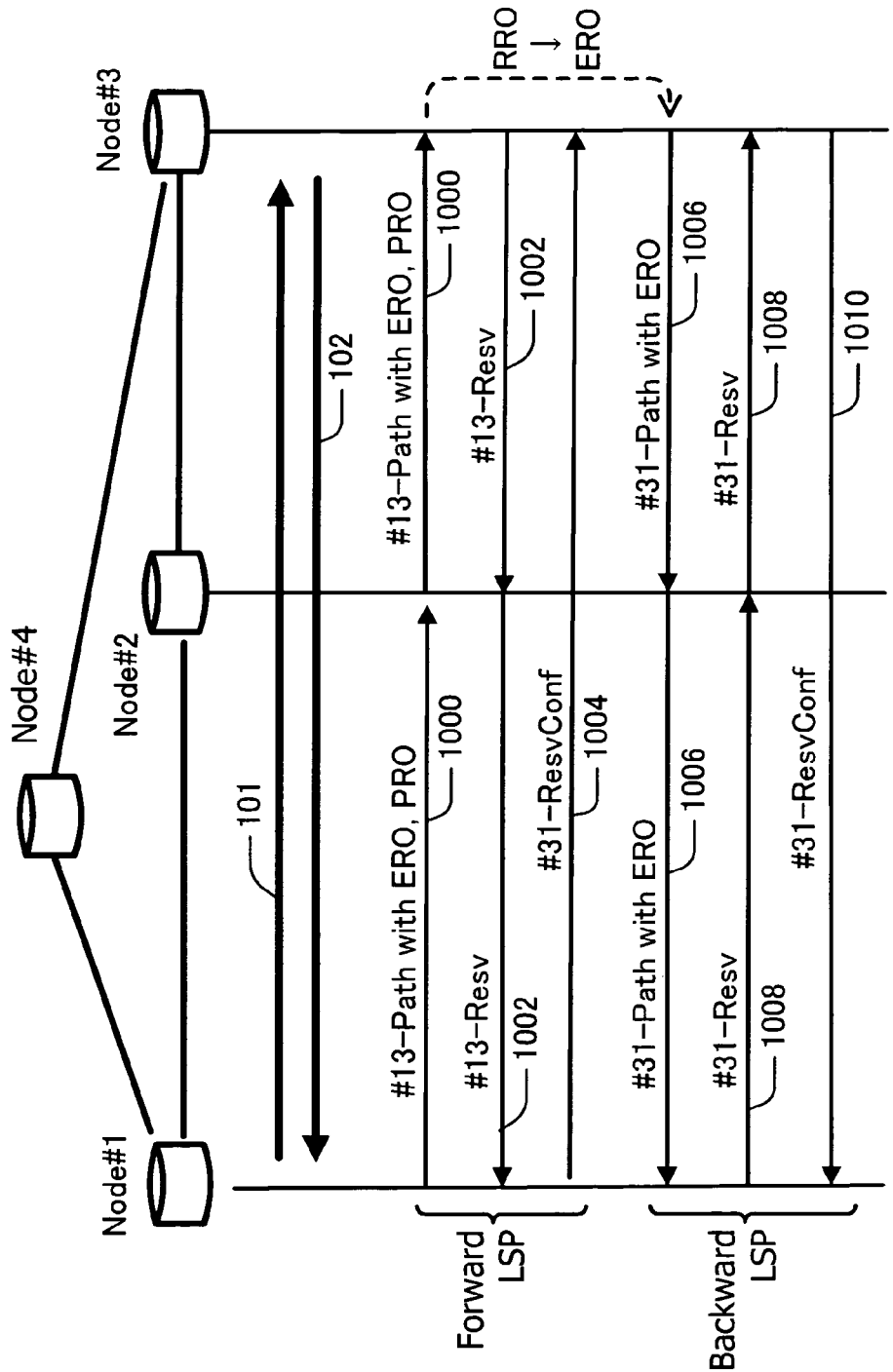
FIG. 3 is a sequence diagram illustrating an establishing procedure of a bidirectional path, according to an embodiment.

FIG. 3 is a sequence diagram illustrating a procedure for establishing a bidirectional LSP between a node #1 (a first node) and a node #3 (a second node) according to an embodiment. In FIG. 3, first, a path message 1000 (a first path message) for establishing a forward path of the node #1 to node #3 (a first path 101) is sent from the node #1. A RRO (Record Route Object) for recording a route through which the path message is actually passed is included in the path message 1000 in addition to an ERO (Explicit Route Object) for specifying the route of a path.

There are Strict specification for strictly specifying the route of a path which should be established, for example, by the identification number of the node device and the identification number of the input interface and Loose specification for specifying the route, for example, only by the identification number of the node device in the ERO for specifying the route of a path. In the case of the former, no selection of the route is made by a node on the way of the route. However, in the case of the later, the route to the specified node is independently selected by each node. In each case, information regarding a route through which the path message is actually passed is accumulated and recorded in the RRO.

When the path message 1000 (the first path message) is received, the node #3 (the second node) which is the end point node of the forward path returns a reserve message 1002 in accordance with MPLS RSVP-TE. The reserve message 1002 is transferred in the backward direction along the route through which the path message 1000 is passed in accordance with MPLS RSVP-TE. A label assigned to a link between the nodes for the forward path is noticed by the reserve message 1002. The establishment of the forward LSP of the node #1 to node #3 (the first path 101) is completed when the reserve message 1002 reaches the node #1 which is the start point of the forward path.

When the path which should be set is a bidirectional path, the node #1 (the first node) further sends a reserve confirmation message 1004 along the established path. The reserve confirmation message is regulated in RSVP (Resource reSerVation Protocol) of RFC2205 as one for confirming that the reserve message is reached to the start point node and the path (the first path) is established. The usage of the message is an option. However, in the embodiment, the reception of the reserve confirmation message shall be a trigger for establishing a backward path (a second path 102) when a bidirectional path is established at the same time.

That is, when the reserve confirmation message 1004 is received, the node #3 (the second node) sends a path message 1006 (a second path message) for establishing a backward path of the node #3 to node #1. An ERO determined from the content of the RRO of the path message 1000 of the forward path is included in the path message 1006. The ERO for specifying the same route as the route shown by the RRO contained in the forward path is specified in the path message 1006, so that the path message 1006 is reached to the node #1 by following the same route as the established forward path in the backward direction. The node #1 sends a reserve message 1008 toward the node #3 in response to the path message 1006 in accordance with the RSVP-TE. By the reserve message 1008, a label of the backward path is distributed and the backward path (the second path 102) is established by the same route as that of the forward path (the first path 101). When a RRO is respectively added to the path message 1006 for the backward path and the reserve message 1002 for the forward path, the node #1 can confirm that the forward path (the first path 101) and the backward path (the second path 102) are established on the same route by comparing the both RRO's.

Finally, although not essential, a reserve confirmation message 1010 is sent to the node #1 from the node #3.

Figure 4:
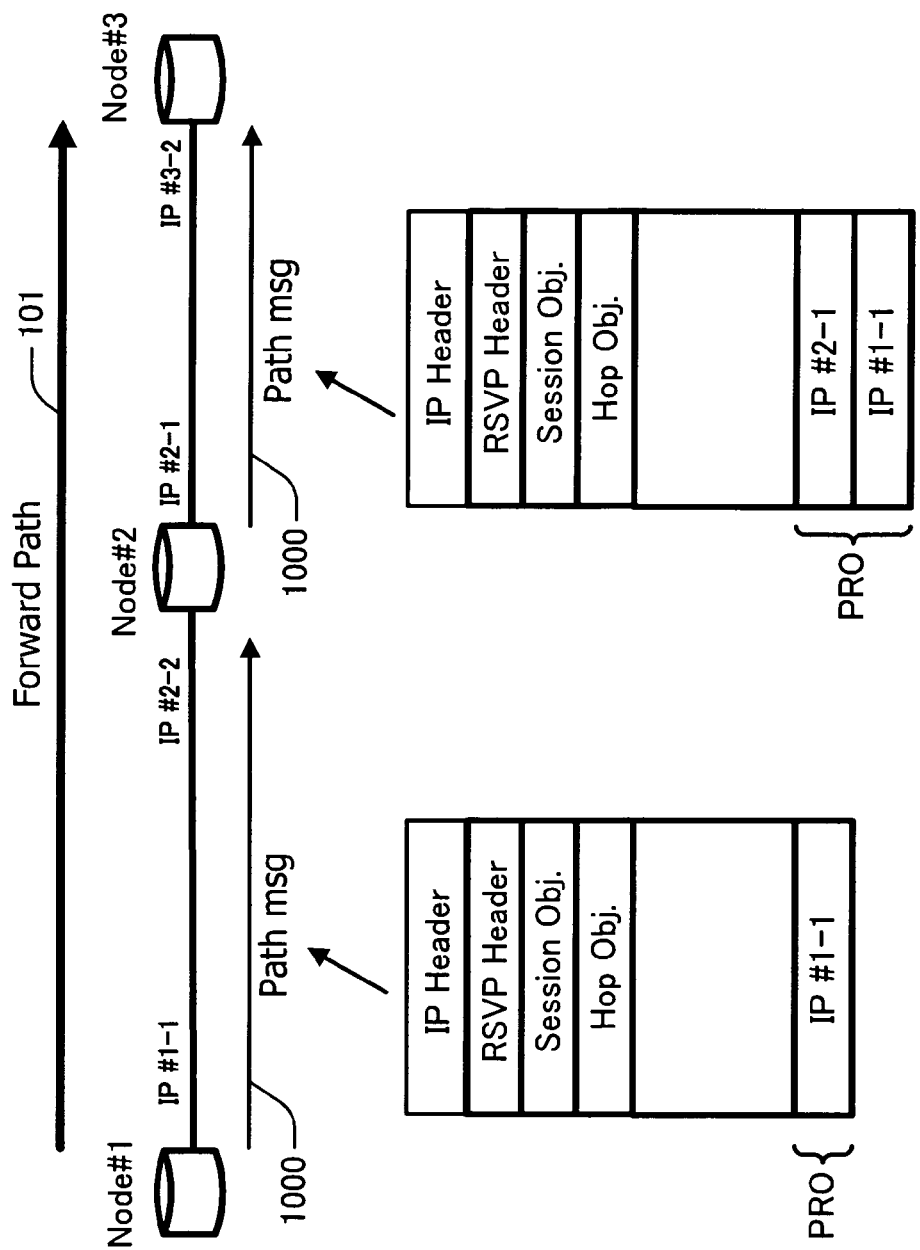
FIG. 4 is a diagram illustrating a RRO contained in a path message of a forward path in detail, according to an embodiment.

The relation between the RRO contained in the pas message for the forward path 101 and the ERO for the backward path 102 determined therefrom will be described in further detail. As shown in FIG. 4, the identification number of the output inter face used in the respective link is sequentially accumulated with the node identification number in the RRO contained in the path message 1000 for establishing a forward path 101 from the node #1 to the node #3. In the example shown in FIG. 4, the identification number IP #1-1 of the output interface used in the node #1 is included in the RRO of the path message 1000 transferred from the node #1 (the first node) to the node #2. The identification number IP #2-1 of the output interface used in the node #2 is added to the head in the RRO of the path message 1000 transferred from the node #2 to the node #3 (the second node).

Figure 5:
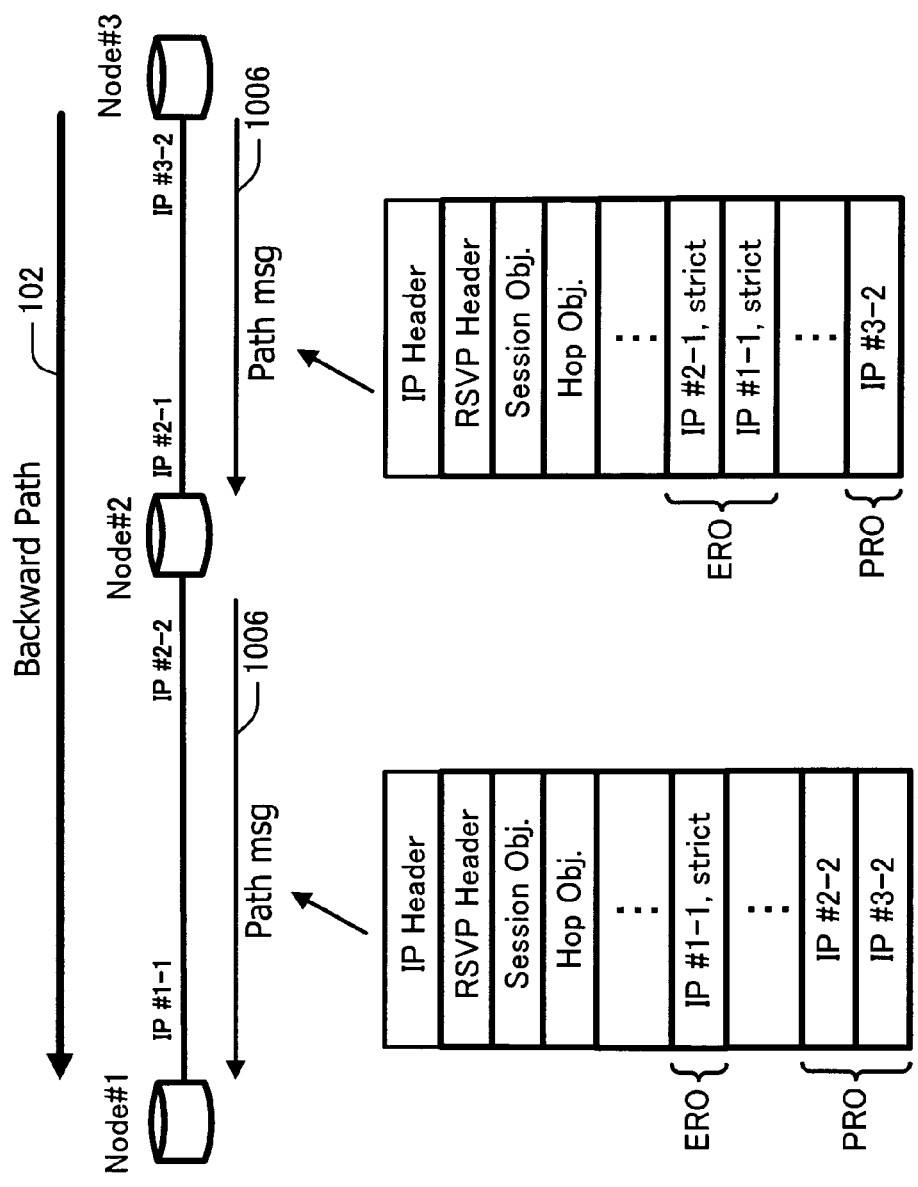
FIG. 5 is a diagram illustrating an ERO contained in a path message of a backward path in detail, according to an embodiment.

As shown in FIG. 5, the copy of the content of the above described RRO is stored in the ERO of the path message 1006 for establishing a backward path 102 from the node #3 to the node #1 with a flag for indicating the strict specification. The route of the path which should be set is recognized by sequentially taking out the content of the ERO from the head of the path message 1006 in each node. Herewith, the backward path can be established on the same route as the forward path.

Herein, when managing the both of a bidirectional LSP of the embodiment and a conventional unidirectional LSP, it is required for an Ingress node to mount an identifier indicating to set the LSP by a bidirectional LSP in the path message when setting a bidirectional LSP and it is required for an Egress node to check the identifier to identify that which LSP is required and to change the operation. In order to indicate the setup requirement for a bidirectional LSP in the path message, a new object may be added. However, this can not be performed within the regulation of the existing RSVP-TE. In order to perform within the regulation of the existing RSVP-TE, a method for using Session name field of Session Attribute Object may be employed. Generally, the Session name field is a field for showing the name of the LSP with a character string in order to facilitate the management and, for example, "1 to 2" or the like may be provided. It may be determined that when the field is used and the last of the character string is "_bi" (for example, "1 to 2 _bi" in the above example), a bidirectional LSP is indicated in the management to perform the processing as a bidirectional LSP.

In the example described above, the node #3 which is the end point node of the forward path sends the path message 1006 for the backward path by regarding the reception of the reserve confirmation message 1004 for the forward path as a trigger to start the establishment procedure for the backward path. However, the path message for the backward path may be sent by estimating the reception of the path message 1000 for the forward path as a trigger to start the establishment procedure for the backward path.

In the embodiment, a function which should be applied to the node device in which MPLS RSVP-TE is already supported will be described below.

(1). Start Point Node of Forward Path (node #1, or a first node)
  (i) A function to add an identifier of a bidirectional path/ unidirectional path to a path message (when a bidirectional path and a unidirectional path are mixed).
  (ii) A function for confirming agreement between the route of a forward path and the route of a backward path (when confirming matching of the routes).
(2). Start Point Node of Backward Path (node #3, or a second node)
  (i) A function for responding to the reception of a reserve confirmation message or a path message for a forward path to send a path message for a backward path.
  (ii) A function for extracting a RRO contained in the path message for the forward path to insert in the path message for the backward path as an ERO of strict specification.
  (iii) A function for recognizing whether the required path is a bidirectional path or a unidirectional path (when a bidirectional path and a unidirectional path are mixed).
(3). Relay Node
There is no function to be applied.

Figure 6:
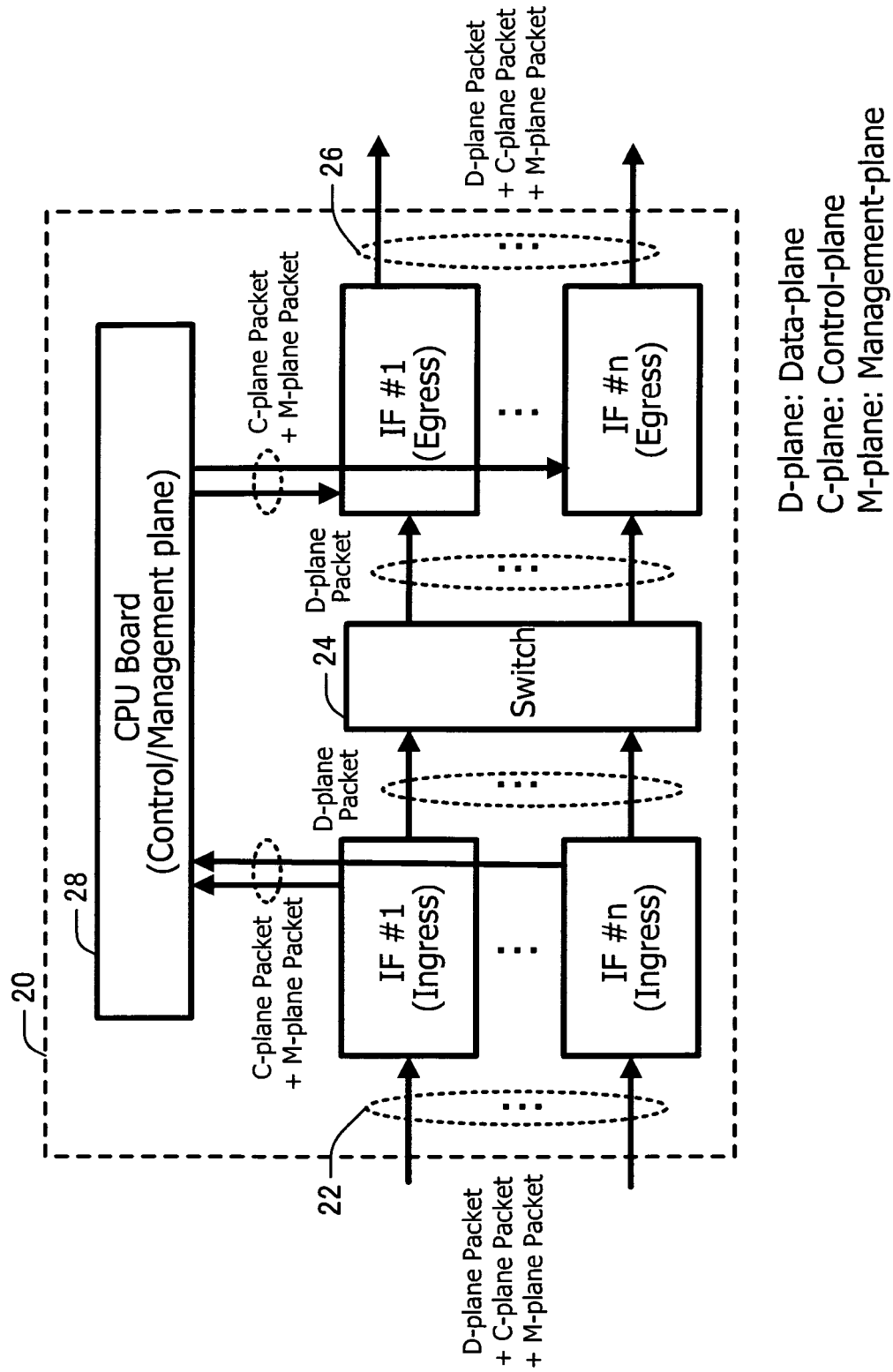
FIG. 6 is a block diagram illustrating an example of a structure of a node device to which the embodiment is applied.

An example of a structure of a node device 20 to which the embodiment is applied is shown in FIG. 6. D (data)-plane packet for carrying a date, C (control)-Plane packet for carrying a control message such as the path message and the reserve message described above, and M (management)-plane packet for carrying a message such as a path establishing requirement from an operator to manage a network, are included in the packet processed by the node device 20. D-plane packet is supplied to an interface 26 at the Egress side from an interface 22 at the Ingress side via a switch 24. C-Plane packet and M-plane packet are supplied to a CPU board 28 from the interface 22 at the Ingress side and, C-Plane packet and M-plane packet from the CPU board 28 are directly supplied to the interface 26 at the Egress side.

Figure 7:
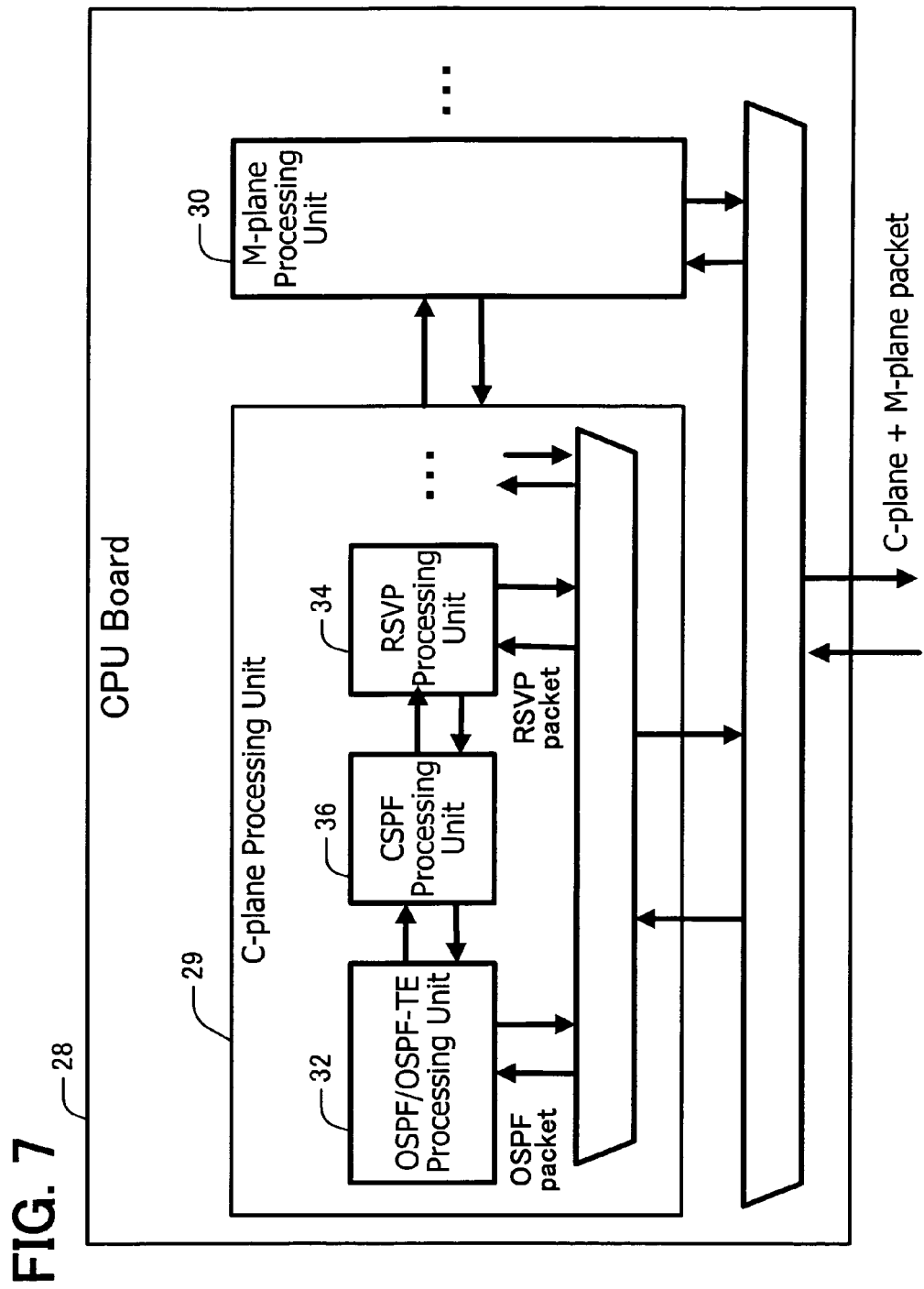
FIG. 7 is a block diagram illustrating a function of a CPU board of FIG. 6.

FIG. 7 is a block diagram illustrating a function of the CPU board 28. The function of the CPU board 28 is divided into a C-plane processing unit 29 for processing C-plane packet and an M-plane processing unit 30 for processing M-plane packet. The C-plane processing unit 29 includes an OSPF/OSPF-TE processing unit 32, an RSVP processing unit 34, and a CSPF processing unit 36. The OSPF/OSPF-TE processing unit 32 processes OSPF packet for noticing topology information and OSPF-TE (Traffic Engineering) packet for noticing a bandwidth usage amount, and establishes a data base for selecting a route in the CSPF (Constrained Shortest Path First) processing unit 36. The RSVP processing unit 34 performs generation of RSVP packet for carrying the above described pass message, reserve message, or the like and analysis, extraction, insert, or the like of an object in the message. The CSPF processing unit 36 performs a route calculation (selection of route) to the next node specified by the ERO by referring to the data base in response to a request from the RSVP processing unit 34, and assures the band of the path. The calculated result of the route is inserted in the ERO of the path message in the RSVP processing unit 34. The RSVP processing unit 34 also performs management of a label distributed by a reserve message.

Figure 8:
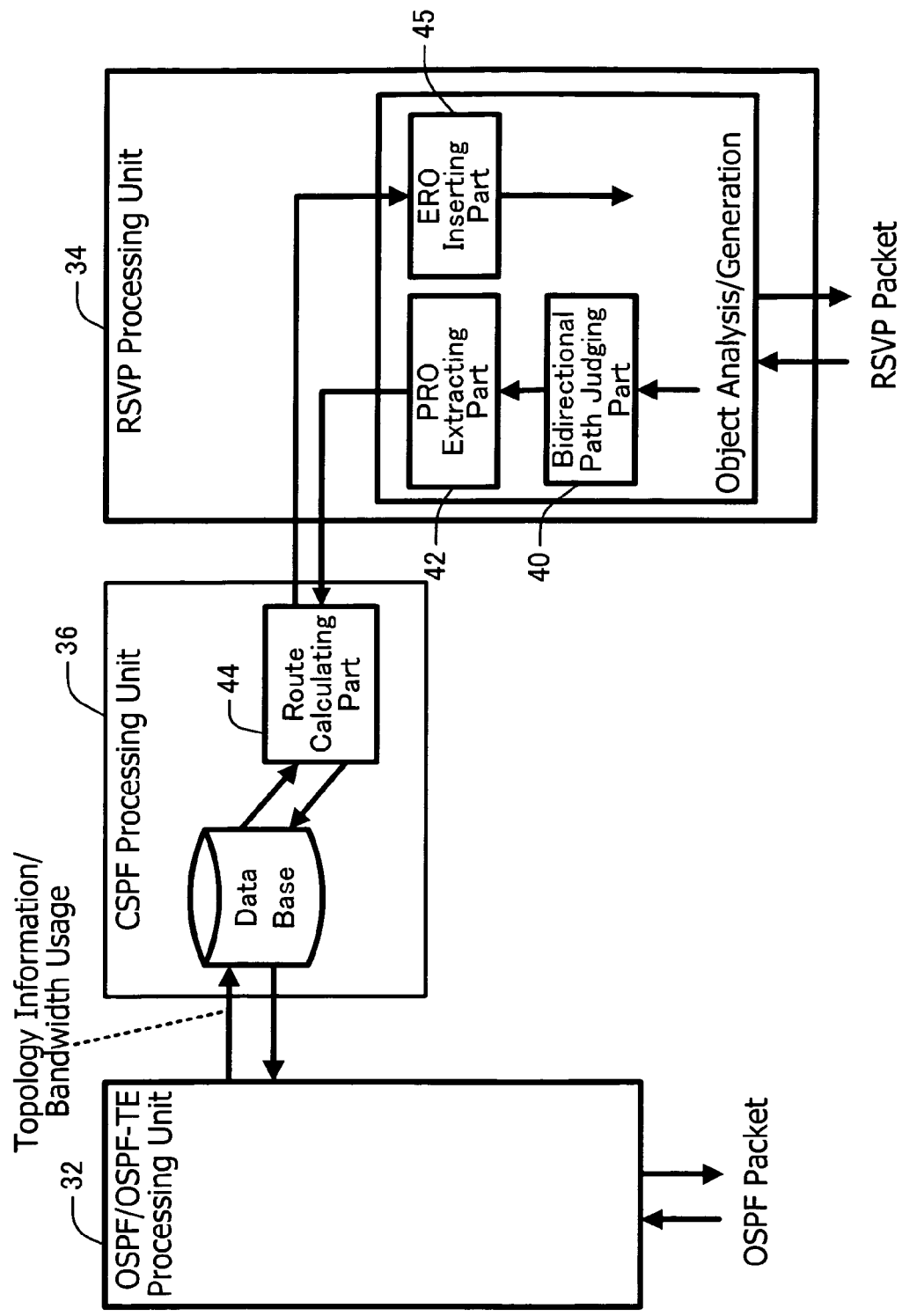
FIG. 8 is a block diagram illustrating a detailed function to be added in order to provide the embodiment in an end point node of a forward path.

FIG. 8 is a diagram illustrating a detailed function which should be newly added in order to provide the embodiment in the end point node of a forward path (node #3 in the example of FIG. 1 to FIG. 5).

A bidirectional path judging part 40 of the RSVP processing unit 34 judges whether establishment of a bidirectional path is required or not when a path message regarding the own node as the end point node is received. When the bidirectional path judging part 40 judged that establishment of a bidirectional path is required, the RSVP processing unit 34 performs the process for establishing a bidirectional path in addition to the normal process of RSVP-TE. That is, the RSVP processing unit 34 extracts the RRO from the path message (PRO extracting part 42), and notices the RRO to a route calculating part 44 of the CSPF processing unit 36. The route calculating part 44 adds a strict flag to the content of the noticed RRO to be regarded as the ERO of a backward path. When a reserve confirmation message for a forward path is received, the RSVP unit 34 generates a backward path message and sends the backward path message into which the ERO noticed from the route calculating part 44 is inserted (ERO inserting part 45).

What is claimed is:
1. A method of setting a bidirectional path between a first node device and a second node device in a network, comprising:
  establishing, by the first and second node devices, a first unidirectional path from the first node device to the second node device in the forward direction, by performing a first unidirectional path establishing procedure including transferring, from the first node device to the second node device, a first path message including a route record indicative of a transfer route through which the first path message is transferred from the first node device to the second node device, the route record storing a sequence of identifiers each identifying an intermediate node device and an output interface of the intermediate node device that have been used for transferring the first path message from the first node device to the second node device; and
  establishing, by the first and second node devices, a second unidirectional path from the second node device to the first node device along the route of the first unidirectional path in the backward direction, by performing a second unidirectional path establishing procedure including transferring from the second node device to the first node device, a second path message including the sequence of identifiers that have been stored in the route record included in the first path message received by the second node device, wherein
  each of the intermediate node devices positioned along the transfer route of the first unidirectional path, sets the second unidirectional path using the sequence of identifiers included in the second path message so that a pair of the first and second unidirectional paths that are established along the same route and have opposite directions with respect to each other, is set as a bidirectional path between the first and second node devices.

2. The method of claim 1, wherein
  the first unidirectional path establishing procedure includes:
    transferring, by the second node device, a first reserve message for carrying a label assigned to the first unidirectional path, from the second node device to the first node device, in response to the reception of the first path message; and transferring, by the first node device, a first reserve confirmation message for confirming the reaching of the first reserve message, from the first node device to the second node device, in response to the reception of the first reserve message, and the second unidirectional path establishing procedure is performed when the second node device has received the first reserve confirmation message.

3. The method of claim 1, wherein the second path establishing procedure is performed when the second node device has received the first path message.

4. The method of claim 1, wherein the first path message further includes an identifier indicating whether a path to be established is unidirectional or bidirectional, and the second path establishing procedure is performed when the second node device has received the first path message including the identifier indicating that a path to be established is bidirectional.

5. A method of setting a bidirectional path between a first node device and a second node device in a network, the method being performed by the second node device, the method comprising:

receiving from the first node device a first path message including a route record indicative of a transfer route through which the first path message is transferred from the first node device to the second node device, so as to establish a first unidirectional path from the first node device to the second node device, the route record storing a sequence of identifiers each identifying an intermediate node device and an output interface of the intermediate node device that have been used for transferring the first path message from the first node device to the second node device; and transmitting, to the first node device, a second path message including the sequence of identifiers that have been stored in the route record included in the first path message, so as to establish a second unidirectional path from the second node device to the first node device, wherein each of the intermediate node devices positioned along the transfer route of the first unidirectional path, sets the second unidirectional path using the sequence of identifiers included in the second path message so that a pair of the first and second unidirectional paths that are established along the same route and have opposite directions with respect to each other, is set as a bidirectional path between the first and second node devices.

6. The method of claim 5, wherein a first reserve message for carrying a label assigned to the first unidirectional path, is transferred from the second node device to the first node device when the second node device has received the first path message, a first reserve confirmation message is transferred from the first node device to the second node device so as to confirm the reaching of the first reserve message, and the second path message is transferred from the second node device to the first node device when the second node device has received the first reserve confirmation message.

7. The method of claim 5, wherein the second path message is transferred from the second node device to the first node device when the second node device has received the first path message.

8. The method of claim 5, wherein the first path message further includes an identifier indicating whether a path to be established is unidirectional or bidirectional, and the second path message is transferred to the first node device when the second node device has received the first path message including the identifier indicating that a path to be established is bidirectional.

9. A node device for setting a bidirectional path between a first node device and the node device in a network, the node device comprising:

a hardware processor configured to:

receive from the first node device a first path message including a route record indicative of a transfer route through which the first path message is transferred from the first node device to the node device, and extract the route record from the first path message, so as to establish a first unidirectional path from the first node device to the node device, the route record storing a sequence of identifiers each identifying an intermediate node device and an output interface of the intermediate node device that have been used for transferring the first path message from the first node device to the node device; and transfer to the first node device a second path message including the sequence of identifiers that have been stored in the route record included in the first path message, so as to establish a second unidirectional path from the node device to the first node device, wherein each of the intermediate node devices positioned along the transfer route of the first unidirectional path sets the second unidirectional path using the sequence of identifiers included in the second path message so that a pair of the first and second unidirectional paths that are established along the same route and have opposite directions with respect to each other is set as a bidirectional path between the first node device and the node device.

10. The node device of claim 9, wherein a first reserve message for carrying a label assigned to the first unidirectional path is transferred to the first node device in response to the reception of the first path message, a first reserve confirmation message is transferred from the first node device to the node device so as to confirm the reaching of the first reserve message, and the second path message is transferred from the node device to the first node device when the node device has received the first reserve confirmation message.

11. The node device of claim 9, wherein the second path message is transferred to the first node device when the node device has received the first path message.

12. The node device of claim 9, wherein the first path message further includes an identifier indicating whether a path to be established is unidirectional or bidirectional, and the second path message is transferred to the first node device when the node device has received the first path message including the identifier indicating that a path to be established is bidirectional.

* * * * *